United States Patent [19]

Hale

[11] Patent Number: 5,185,751
[45] Date of Patent: Feb. 9, 1993

[54] AUTOMATED SINGLE LONGITUDINAL MODE LOCKING SYSTEM

[75] Inventor: Michael O. Hale, Bellevue, Wash.

[73] Assignee: Amoco Corporation, Chicago, Ill.

[21] Appl. No.: 698,571

[22] Filed: May 10, 1991

[51] Int. Cl.$^5$ .............................................. H01S 3/098
[52] U.S. Cl. ........................................ 372/18; 372/29; 372/98; 372/33; 372/92
[58] Field of Search ...................... 372/18-20, 372/25, 29, 33, 92, 97, 98, 102, 107, 108

*Primary Examiner*—Léon Scott, Jr.
*Attorney, Agent, or Firm*—Stephen G. Mican; Thomas W. Tolpin; Frank J. Sroka

[57] ABSTRACT

A method and apparatus for automatically maintaining the length of a laser cavity in a laser system in an optimum single length mode regardless of changes of frequency in the dispersive optics feedback, by sensing a group of pointing directions of a laser beam over a determined range of operating conditions, determining the average pointing position of the laser system for the group of sensed pointing directions and adjusting the length of the laser cavity to conform the pointing direction of the laser system.

10 Claims, 5 Drawing Sheets

AUTOMATED SINGLE LONGITUDINAL MODE LOCKING SYSTEM

BACKGROUND OF THE INVENTION

This invention relates to automated control of laser output characteristics, and more particularly to a method and apparatus for automatic initialization and alignment of laser cavity length to attain and maintain single longitudinal mode (SLM) laser operation over a wide range of selected operating frequencies.

There are many techniques in the prior art for controlling the operating frequency of a laser and the bandwidth or spread of laser output frequencies. There are two distinctly different physical phenomena that control the laser operating frequency and the frequency distribution of its output. The first phenomena relies upon physical dispersion, such as angular changes in wavelength pointing as light passes through a prism or is reflected off of a grating, or a variety of other techniques that alter pointing polarization, or phase as a function of wavelength. The second phenomena is the characteristic of the laser oscillator that limits effective oscillation at frequencies corresponding to wavelengths that are an integer multiple of the round trip path length within the laser oscillator cavity, or $n\lambda = 2L$, wherein n is the integer multiple, $\lambda$ is the wavelength and L is the laser oscillator cavity length.

Both of these phenomena are present in wavelength tunable lasers. The laser output is thus a convolution of the two phenomena. The wavelength dispersive optics are controlled by positional or induced field tuning, while the longitudinal mode distribution is controlled by changing only cavity length.

Recent advances in laser designs have made possible the selection of one longitudinal mode with wavelength dispersive optical elements. The procedures for attaining SLM operation according to the prior art involves alignment of the optical components of the laser cavity followed by alignment of the optically dispersive elements to select wavelength range followed finally by the adjustment of the laser cavity length. In most cases these adjustments are performed manually and the mechanical integrity of the device is relied upon to maintain alignment for an extended period of time.

Cavity length adjustments are typically very sensitive and require some sort of active control to maintain constant cavity length. Many different active feedback loops are available to lock the cavity length to a set value. These feedback loops rely upon physical phenomena that are coupled to the cavity length such as etalon fringes or beam pointing. In laser cavities where a wavelength dispersive element is involved, the output pointing is coupled to the longitudinal mode composition.

Yet, the procedure for attaining single longitudinal mode tracking according to the prior art is still to perform manual cavity length adjustments, followed by startup of an active feedback loop. This manual adjustment has been necessary according to the prior art in order to adjust the laser cavity length.

SUMMARY OF THE INVENTION

The present invention comprises a method and apparatus to automatically adjust cavity length and sense the character of longitudinal modes in the laser output to maintain single longitudinal mode operation even during adjustments in the optically dispersive elements of the laser that cause changes in wavelength. The pointing direction of the output laser beam is used to sense the mode character of the laser variation. Based upon the mode character sensed, the cavity length is automatically varied to achieve a desired pointing direction jitter. The quality of the SLM operation for the laser is sensed by correlating the change in cavity length to the output pointing direction.

In the preferred embodiment, the optimum condition for SLM operation of the laser is determined by randomly or regularly varying the length of the laser cavity to determine the statistical variation of the corresponding output pointing directions. The average output pointing direction with the least statistical jitter is then selected as the optimum condition for SLM operation. The quality of the SLM operation and laser cavity alignment is also determined from the output pointing statistics.

In the preferred embodiment, the methodology for shifting the length of a laser cavity for a laser system in response to a change in pointing direction of the laser beam associated with a dispersive optical feedback system in the laser system comprises the steps of: varying the length of said laser cavity to create a series of laser cavity lengths; sampling the pointing direction of said laser beam for each laser cavity length in said series of lengths to create a series of pointing direction samples that correspond to said series of laser cavity lengths; determining the average pointing direction for said series of pointing direction samples; and maintaining the pointing direction of said laser beam to correspond to said average pointing direction to lock said laser beam in a stable single longitudinal mode.

In the preferred embodiment, the apparatus for shifting the length of a laser cavity for a laser system in response to a change in pointing direction of the laser beam associated with a dispersive optical feedback system in the laser system comprises: means for varying the length of said laser cavity to create a series of laser cavity lengths; means for sampling the pointing direction of said laser beam for each laser cavity length in said series of lengths to create a series of pointing direction samples that correspond to said series of laser cavity lengths; means for determining the average pointing direction for said series of pointing direction samples; and means for maintaining the pointing direction of said laser beam to correspond to said average pointing direction to lock said laser beam in a stable single longitudinal mode.

DESCRIPTION OF THE PREFERRED EMBODIMENT

Figure 1:
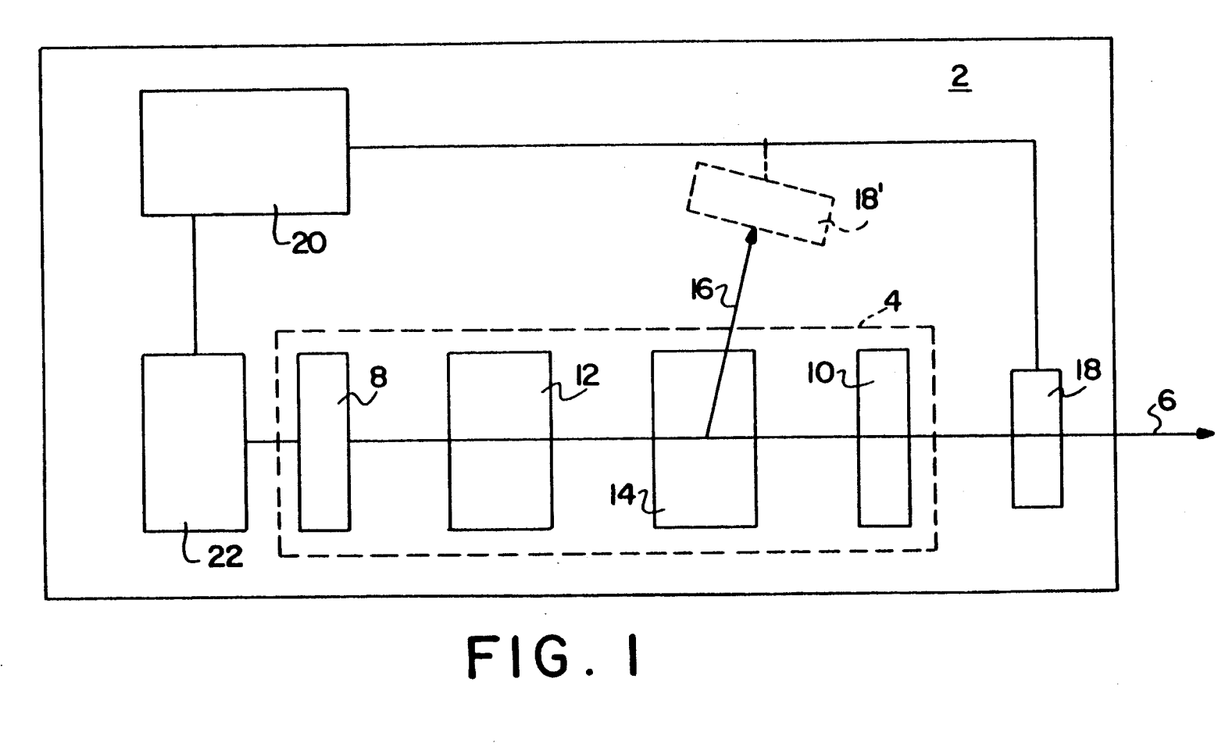
FIG. 1 is a block diagram of a preferred embodiment of the invention.

Referring to the drawings, wherein reference characters designate like or corresponding parts throughout the views, FIG. 1 is a block diagram of a preferred embodiment of the invention. An automated SLM laser system 2 comprises a laser cavity 4 for a laser output beam 6. The laser cavity 4 comprises a rear mirror 8, an output mirror 10, a gain medium 12 and wavelength dispersive optics 14 that provide a predetermined correlation between wavelength and pointing direction for the laser output beam 6 and a portion of the the output of the laser as represented by a dispersion beam 16. The wavelength dispersive optics 14 may comprise elements well known in the art, such as a diffraction grating with a grating feedback mirror.

The pointing direction of the laser output beam 6 is detected by a pointing detector 18. Alternately, the pointing direction of the dispersion beam 16 is detected by a pointing detector 18', shown in dashed line. Furthermore, the pointing direction of any other beam in the laser system 2 that changes with a change in wavelength may be similarly measured, such as beam leakage through the rear mirror 8, brewster reflections from the gain medium 12 or reflections or optical leakage in the dispersion optics 14. The pointing detector 18 may comprise an electro-optic assembly well known in the art, such as a simple bi-cell or quad-cell photodetector in combination with a partially transmissive mirror, to sample at least a portion of the laser output beam 6. If the pointing direction of the dispersion beam is measured, the pointing detector 18' may comprise a simple bi-cell or quad-cell photodetector alone. The pointing detector 18 provides a detection signal to a SLM processor 20. The SLM processor 20 may comprise analog/digital circuitry that implements operations in accordance with the methodology of the invention using any combination of hardware and software as described herein.

The SLM processor 20 collects statistics about the pointing direction of the laser output, defined in terms of a relative pointing angle $\theta$, in relation to the length of the laser cavity 4 in the laser system 2. To this end, the SLM processor 20 varies the position of a cavity length determining element, such as the rear mirror 8, with a position transducer 22 that is mechanically coupled to the rear mirror 8. The position transducer 22 may comprise any well known electro-mechanical positioner that provides the desired degree of linear travel and positional resolution.

The position of the rear mirror 8. may be varied randomly or regularly, although random variation is preferred. The SLM processor 20 samples the detection signal from the pointing detector 18 as the position of the rear mirror 8 is so varied to determine the pointing direction of the dispersion beam 16 as a function of the corresponding change in length of the laser cavity 4. The SLM processor 20 statistically analyzes the pointing direction of the dispersion beam 16 as determined from the detection signal samples.

When the length of the laser cavity 4 is varied randomly, the pointing direction of the dispersion beam 16 varies randomly as well. These values of pointing direction are preferably stored for statistical analysis by the SLM processor 20. The statistical analysis performed by the SLM processor 20 may comprise one or more of any well known relationship between the relative pointing angle $\theta$ of the pointing direction for the dispersion beam 16 and the length of the laser cavity 4, such as the average pointing direction, $\theta_{avg}$ or standard deviations or correlations between $\theta$ and the length of the laser cavity 4. However, the statistical analysis must comprise at least the determination of $\theta_{avg}$ to automatically determine the length of the laser cavity 4, as described herein.

The SLM processor 20 then compares the current value of $\theta$ with $\theta_{avg}$ and drives the position transducer 22 to change the position of the rear mirror 8 in proportion to the difference. This changes the length of the laser cavity 4. The position of the rear mirror 8 is shifted to make the difference between the currently measured value of $\theta$ and $\theta_{avg}$ negligible. In this way, a feedback loop between the pointing detector 18 and the rear mirror is established under control of the SLM processor 20 to automatically lock the currently measured value of $\theta$ to the value of $\theta_{avg}$.

Figure 2:
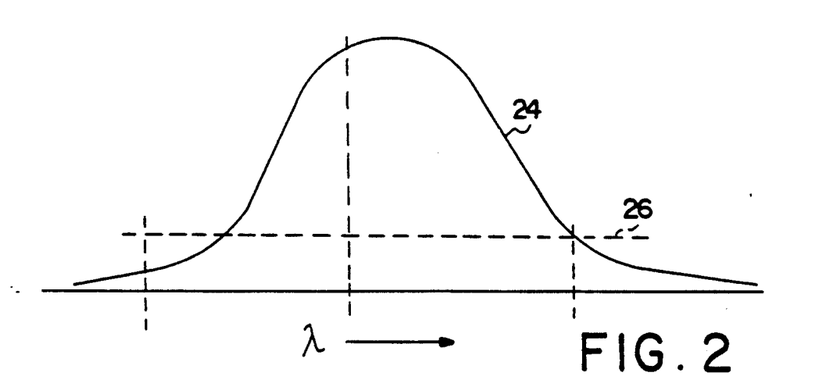
FIG. 2 is a graphical representation of the dispersive optics feedback of the laser system for the preferred embodiment shown in FIG. 1.

FIG. 2 is a graphical representation of the dispersive optics feedback of the laser system 2 that comprises the gain of the laser cavity 4 as a function of wavelength $\lambda$ under feedback control by the SLM processor 20 as described herein. A line 24 represents the gain of the laser cavity 4. A lasing threshold level represented by a dashed line 26 represents the minimum gain necessary to initiate lasing in the laser cavity 4.

Figure 3:
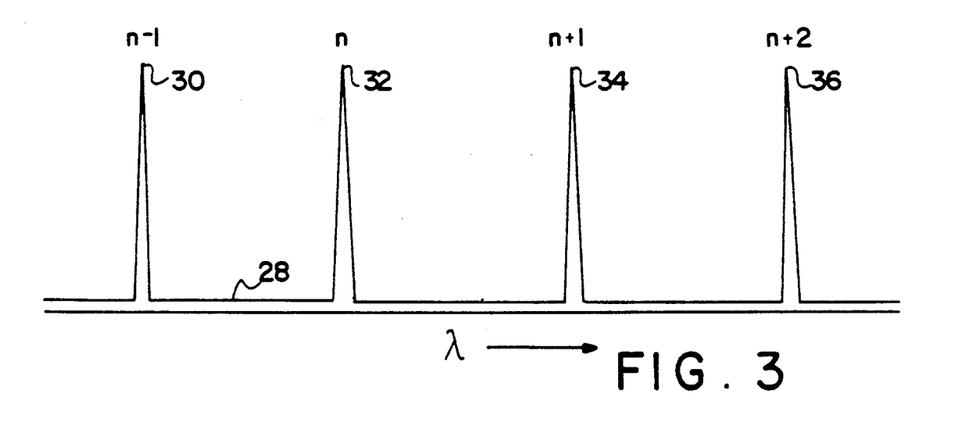
FIG. 3 is a graphical representation of the relative amplitude of the longitudinal modes that are established by the length of the laser cavity for the preferred embodiment.

FIG. 3 is a graphical representation of the relative amplitude of the longitudinal modes that are established by the length of the laser cavity 4 in accordance with the longitudinal mode constraint $n\lambda = 2L$ as described herein. A line 28 represents the relative amplitude of the longitudinal modes. Points 30, 32, 34, and 36 represent the maxima for representative longitudinal modes designated n−1, n, n+1, and n+2, respectively. As described herein, the length of the laser cavity 4 determines the wavelengths of the maxima for the longitudinal modes, as represented by the points 30, 32, 34 and 36 in FIG. 3. The convolution of these maxima in combination with the bandwidth of the dispersive optics feedback represented by line 24 shown in FIG. 2 characterize the spectral content of the laser output beam 6.

The difference in wavelength between the maxima for the longitudinal modes, as represented by the points 30, 32, 34 and 36 in FIG. 3, is determined according to the relationship $\Delta\lambda = \lambda^2/2L$, where $\Delta\lambda$ is the difference in wavelength between modes. Comparing FIGS. 2 and 3, it is evident that the bandwidth of the dispersive optics feedback is typically much wider than the difference in wavelength between longitudinal modes.

When the wavelengths of any of the longitudinal modes of the laser cavity 4 are within the range of wavelengths along the line 24 in FIG. 2 that the dispersive optics feedback pass above the lasing level represented by the line 26, the laser output beam 6 has a spectral content that includes all longitudinal modes within this range of wavelengths.

Figure 4:
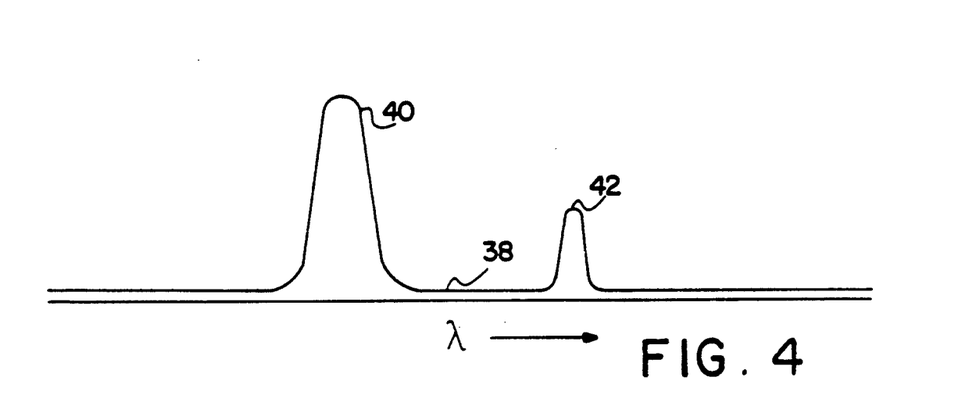
FIG. 4 represents the spectral content of the laser output beam for the combination of the dispersive optics feedback bandwidth shown in FIG. 2 and the wavelength distribution of longitudinal modes of the laser cavity shown in FIG. 3.

FIG. 4 represents the spectral content of the laser output beam 6 for the combination of the dispersive optics feedback bandwidth shown in FIG. 2 and the wavelength distribution of longitudinal modes of the laser cavity 4 shown in FIG. 3. It should be noted that the spectral content of the laser output beam 6 is the convolution of the two functions, at least between the range of wavelengths over which the dispersive optics feedback is above the lasing threshold as represented by the line 26. A line 38 in FIG. 4 represents the amplitude of the laser output beam 6 as a function of wavelength. Thus, in this case, the longitudinal modes n and n+1, as represented by the points 30 and 32 in FIG. 3, are both included in the output beam 6 of the laser system 2, with their relative maxima occuring at points 40 and 42 respectively along the line 38.

The dispersive optics 14 typically comprises a grating that disperses the internal laser light within the laser system 2 according to the relationship $n\lambda/d = \sin\theta_1 - \sin\theta_2$, wherein n is the grating order, $\lambda$ is the wavelength, d is the spacing between grooves in the grating, $\theta_1$ is the input angle of the output beam 6 and $\theta_2$ is the output angle of the dispersion beam 16. More specifically, $\theta_1$ is the angle of the laser output beam 6 with respect to the perpendicular of the grating and $\theta_2$ is the angle of the dispersion beam 16 with respect to the perpendicular of the grating. As the laser system is tuned, the input angle $\theta_1$ and the output angle $\theta_2$ both vary according to wavelength of the laser output beam 6.

Figure 5:
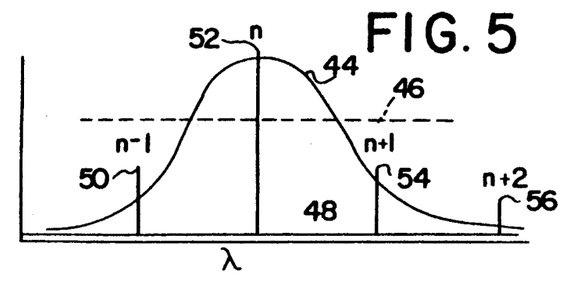
FIGS. 5, 6 and 7 represent the correlation between the length of the laser cavity, the pointing direction of the dispersion beam, and overlap of the dispersive optics feedback bandwidth over more than the difference of wavelength between longitudinal modes.
Figure 6:
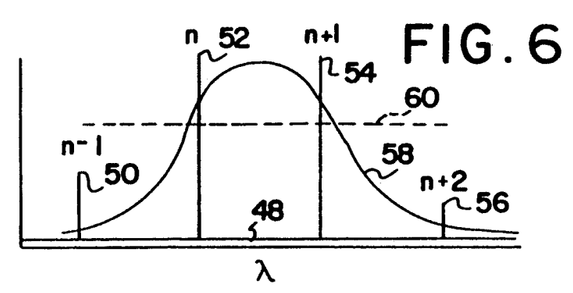
Figure 7:
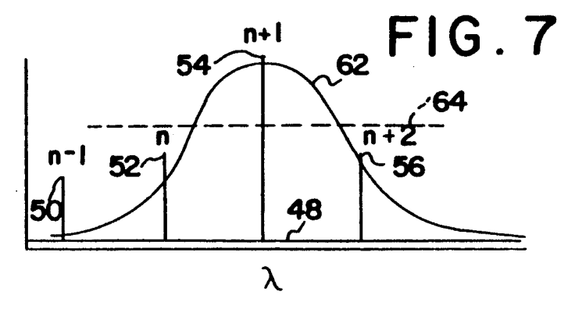

FIGS. 5, 6 and 7 represent the correlation between the length of the laser cavity 4, beam pointing direction, and overlap of the dispersive optics feedback bandwidth over more than the difference of wavelength between longitudinal modes. FIG. 5 shows the dispersive optics bandwidth, represented by a line 44, and the associated lasing threshold level, represented by a line 46, relative to longitudinal mode maxima n−1, n, n+1 and n+2 of the laser cavity 4, represented on a line 48 by points 50, 52, 54 and 56, respectively.

FIG. 5 shows the condition where the length of the laser cavity 4 corresponds to a length L that places the longitudinal mode n with its maxima aligned with the peak of the dispersion optics bandwidth curve at the point 52. In this case, the adjacent modes n−1 and n+1 are separated far enough away from the peak of the dispersion optics bandwidth curve so that their maxima, represented by the points 50 and 54, respectively, cannot exceed the lasing threshold level represented by the line 46. Thus, the laser output beam 6 has a spectral content that corresponds to a single longitudinal mode condition.

FIG. 6 shows the condition where the length of the laser cavity 4 corresponds to a length L plus $\Delta L$ that places the longitudinal modes n and n+1 with their maxima symmetrically aligned on either side of the peak of the dispersion optics bandwidth curve, represented by a line 58, at the points 52 and 54. In this case, the maxima of both of these modes exceed the lasing threshold, as represented by a line 60 in FIG. 6, so that the laser output beam has a spectral content that corresponds to a multimode condition, comprising both the modes n and n+1. Thus, the shift in the length of the laser cavity 4 causes the laser system 2 to lose its single longitudinal mode operation, if the length is not corrected.

FIG. 7 shows the condition where the length of the laser cavity 4 corresponds to a length L plus $2\Delta L$ that places the longitudinal mode n+1 with its maxima aligned with the peak of the dispersion optics bandwidth curve, represented by a line 62, at the point 54. In this case, the adjacent modes n and n+2 are separated far enough away from the peak of the dispersion optics bandwidth curve so that their maxima, represented by the points 52 and 56, respectively, cannot exceed the lasing threshold level represented by a line 64 in FIG. 7. Thus, the laser output beam 6 has a spectral content that corresponds to a single longitudinal mode condition.

The three different conditions described above with respect to shifts in the length of the laser cavity 4 shown in FIGS. 5, 6 and 7 cause corresponding shifts in the pointing directions of the modes n−1, n, n+1 and n+2 relative to the ideal pointing direction that is represented by $2L/\lambda$. The resulting pointing directions for the conditions shown in FIGS. 5, 6 and 7 are shown in FIGS. 8, 9 and 10, respectively.

Figure 8:
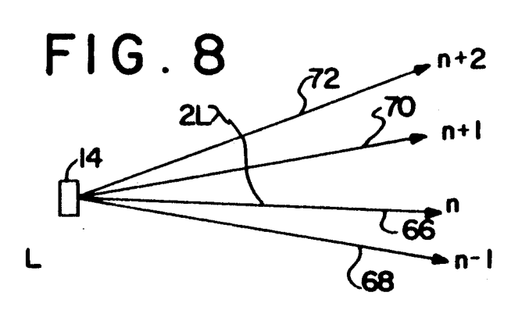
FIGS. 8, 9 and 10 are the resulting pointing directions for the conditions shown in FIGS. 5, 6 and 7, respectively.

In FIG. 8, the ideal pointing direction according to the relationship $2L/\lambda$ is represented by a vector 66 that extends from the dispersive optics 14. Since the length of the laser cavity 4 is L in this case, the longitudinal mode n has a pointing direction that is identical with that represented by the vector 66. The pointing directions for the other modes n−1, n+1 and n+2 relative to the dispersive optics 14. are represented by vectors 68, 70 and 72, respectively.

Figure 9:
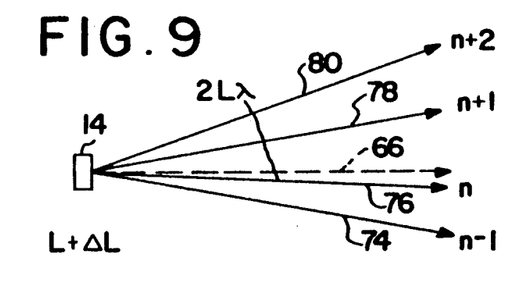
Figure 10:
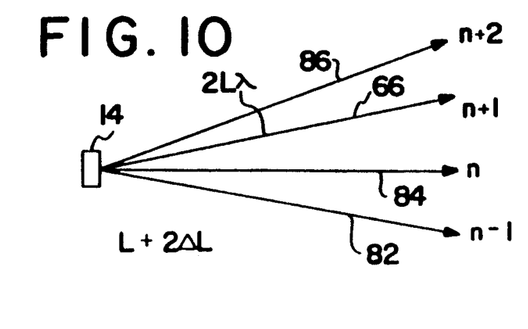

In FIG. 9, the pointing directions relative to the dispersive optics 14 that correspond to the longitudinal modes n−1, n, n+1 and n+2 are represented by vectors 74, 76, 78 and 80 respectively. Their relationship to the ideal pointing direction represented by the vector 66 is shifted with respect to the arrangement shown in FIG. 8 because of the additional length $\Delta L$ of the laser cavity 4. In this instance, the vector 66 that represents the pointing direction corresponding to $2L/\lambda$ is intermediate the vectors 76 and 78 that correspond to longitudinal modes n and n+1, rather than coincident with the pointing direction that corresponds to the longitudinal mode n as shown in FIG. 7.

As described in connection with the description of FIG. 6, this condition results in multi-mode operation, with lasing occuring in both the n and n+1 longitudinal modes. It should be noted that a change in path length from this condition will cause the operation to shift to single mode operation in the n or the n+1 modes, depending on whether the change is an increase or a decrease in path length.

Thus, this condition is inherently unstable because of the tendency of the laser output beam 6 to flip out of multi-mode operation into either of at least two different single modes, depending on any small increase or decrease in the overall length of the laser cavity. Referring FIGS. 6 and 9 together, it should be noted that any relative shift of the longitudinal modes n and n+1 occur along the opposite slopes of the dispersive optics feedback path. A small shift in length of the laser cavity 4 results in a greater change in amplitude of the dispersive optics feedback for the lasing modes n and n+1 under the conditions shown in FIGS. 6 and 9 than results for the lasing mode n under the conditions shown in FIGS. 5 and 8 because the longitudinal mode n is positioned within the relatively shallow slope of the peak of the dispersive optics feedback curve.

In FIG. 10, the pointing directions relative to the dispersive optics 14 that correspond to the longitudinal modes n−1, n and n+2 are represented by vectors 82, 84 and 86, respectively. Their relationship to the ideal pointing direction represented by the vector 66 is shifted with respect to the arrangement shown in FIG. 8 because of the additional length 2ΔL of the laser cavity 4. In this case the pointing direction of the longitudinal mode n+1 is coincident with the ideal pointing direction represented by the vector 66. Referring to FIGS. 7 and 10 together, it is evident that the only the longitudinal mode that is positioned along the dispersive optics feedback curve to have sufficient amplitude to lase is the longitudinal mode n+1. Because the lasing mode n+1 is aligned with the shallow sloped peak of the dispersive optics feedback curve, stable single mode operation is possible regardless of small variations of length in the laser cavity 4.

Figure 11:
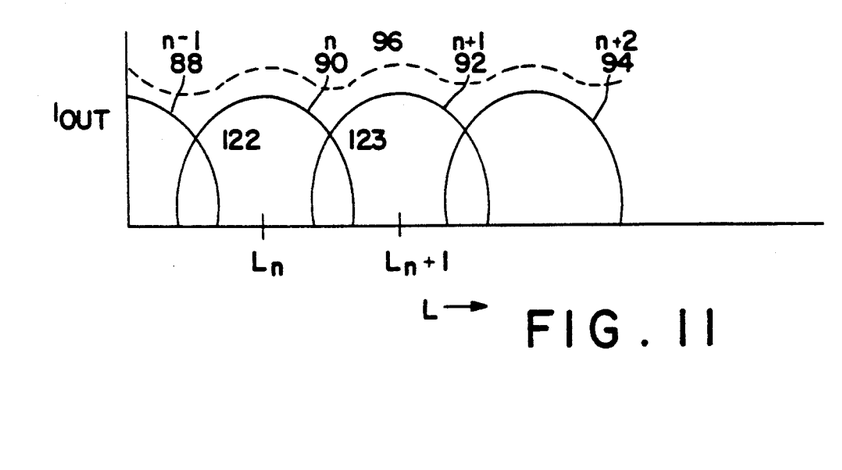
FIG. 11 is a graphical representation of the intensity of of the laser output beam for each of several consecutive individual modes n−1, n, n+1 and n+2, as well as the total intensity of the laser output beam, as a function of the length of the laser cavity 4.

FIG. 11 is a graphical representation of the intensity of of the laser output beam 6 for each of the individual modes n−1, n, n+1 and n+2, as well as the total intensity of the laser output beam 6, as a function of the length of the laser cavity 4. The characteristic amplitude curves of the longitudinal modes n−1, n, n+1 and n+2 are represented by lines 88, 90, 92 and 94, respectively. The characteristic curve for the total amplitude of the laser output beam is represented by a line 96. Because of overlap of the longitudinal mode characteristic curves, the total output energy of the laser output beam 6 as represented by the line 96 varies only slightly even when the length of the laser cavity is not optimum for any mode and multi-mode operation occurs. Thus, measured output power of the laser output beam 6 is not a good indicator of single longitudinal mode operation.

Figure 12:
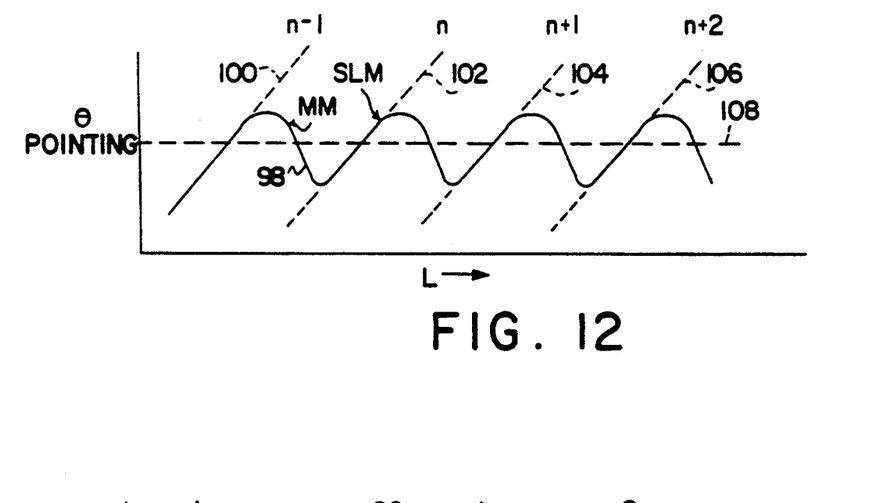
FIG. 12 is a graphical representation of the pointing direction of the dispersion beam as a function of the length of the laser cavity

FIG. 12 is a graphical representation of beam pointing direction as a function of the length of the laser cavity 4. A line 98 represents the dispersion angle $\theta$ of the beam pointing direction as a function of the length of the laser cavity 4. Dashed lines 100, 102, 104 and 106 represent the range of dispersion angles of the pointing directions for modes n−1, n, n+1 and n+2, respectively, that must be tracked so that the laser output beam 6 operates in a single longitudinal mode. Thus, the portions of the line 98 that follow the dashed lines 100, 102, 104 and 106 represent the conditions under which the laser output beam 6 remains in a single longitudinal mode, the mode being that of the respective dashed line that the line 98 tracks. Those portions of the line 98 that deviate from the dashed lines represent the conditions under which the laser output beam 6 operates in multiple longitudinal modes. The average value of dispersion angle $\theta_{avg}$ for the line 98 is represented by a line 108.

Figure 13:
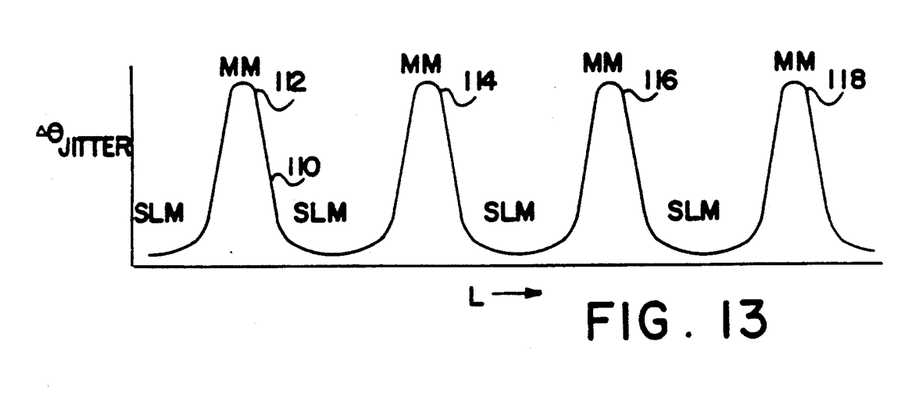
FIG. 13 is a graphical representation of pointing direction jitter of the dispersion beam as a function of the length of the laser cavity.

It should be noted that conditions for operation in multimode operation are unstable, as described in connection with the description of FIGS. 5, 6 and 7, so that the measued pointing direction exhibits pronounced pointing direction jitter compared to operation in a single longitudinal mode. This is illustrated in FIG. 13, wherein a line 110 represents pointing direction jitter of the measured pointing direction as a function of the length of the laser cavity 4. The characteristic curve formed by the line 110 has a series of peaks 112, 114, 116 and 118 that correspond to conditions under which the laser output beam 6 operates under multi-mode conditions. The valley regions of the curve between the peaks 112, 114, 116 and 118 correspond to the conditions under which the laser output beam 6 operates under multi-mode conditions.

Consequently, the SLM processor 20 maintains ideal single mode operation for the laser cavity 4 by determining the average beam pointing direction represented by $\theta_{avg}$ as the laser cavity 4 is changed in length, as represented by the line 108 in FIG. 12, and adjusting the length of the laser cavity to maintain the beam pointing direction represented by $\theta$ at this average pointing direction $\theta_{avg}$. The SLM processor 20 easily locks the laser system 2 in one of the single longitudinal modes that correspond to stable operation with the adjusted length, since multi-mode operation is an unstable condition.

In the preferred embodiment, the pointing detector 18 comprises a bi-cell photodetector. The pointing detector 18 thus has two output signals, referred to as $I_{right}$ and $I_{left}$, respectively. The SLM processor compares these two signals to determined the balance of light from the measured beam that falls on the respective halves of the pointing detector 18. This balance is referred to as the variable balance %, and is preferably determined according to the relationship: variable balance $\% = (I_{right} - I_{left})/(I_{right} + I_{left})$. Thus, the term variable balance % is a measure of the pointing centering on the pointing detector 18.

Figure 14:
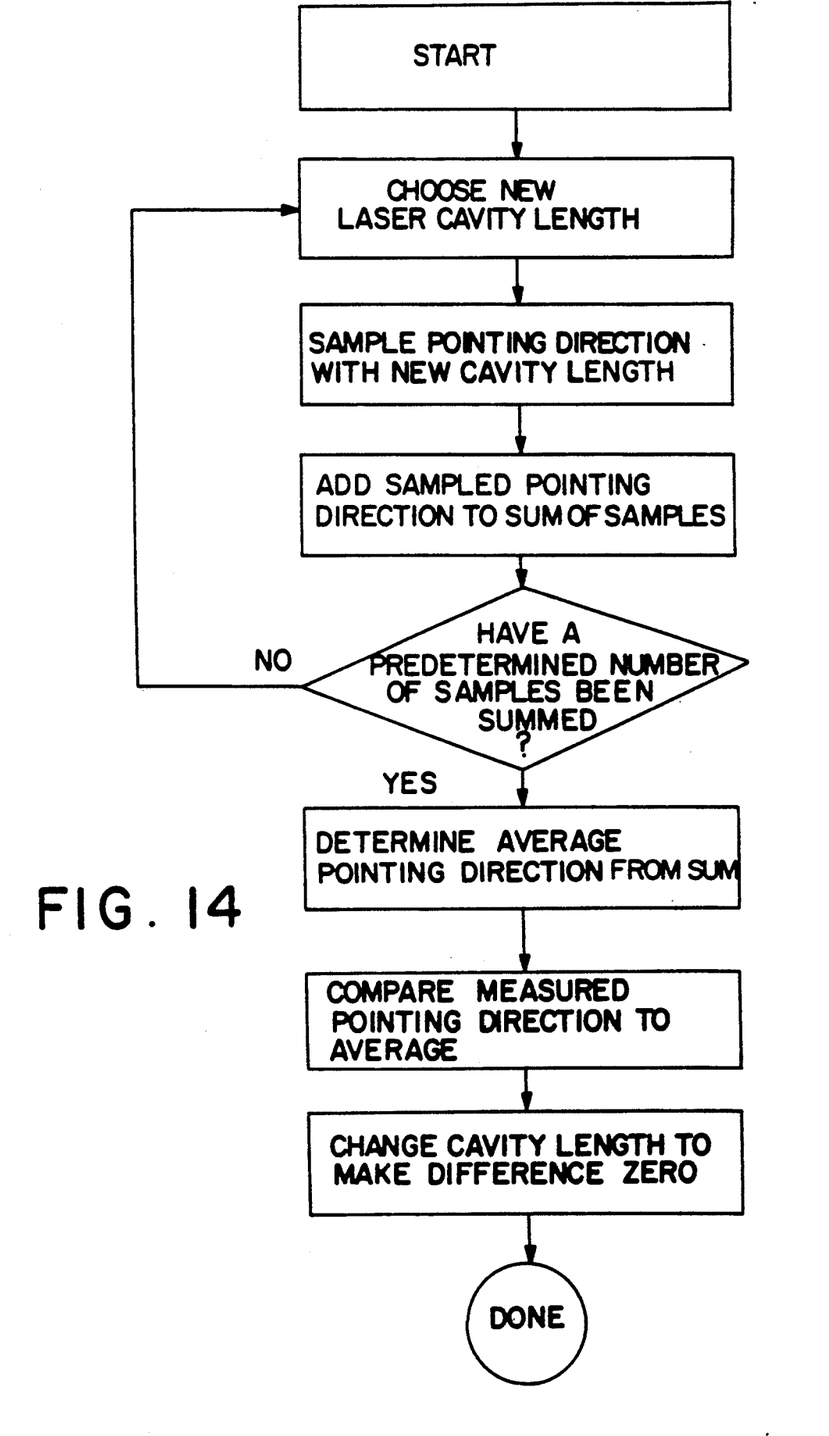
FIG. 14 is a flow chart that shows the methodology of the preferred embodiment.

The SLM processor 20 preferably makes a large number of random changes, such as 600, in the length of the laser cavity 4 by shifting the position of the rear mirror 8 with the position transducer 22, and measures the value of variable balance % for each random position of the rear mirror 8. The SLM processor 20 then determines $\theta_{avg}$ from the average of these measured values Finally, the SLM processor 20 periodically samples the value of variable balance % and compares it to the value of $\theta_{avg}$ The SLM processor 20 moves the position of the rear mirror 8 in response to the difference to change the length of the laser cavity 4 so that the difference approximates zero. This operation forms a feedback loop that automatically adjusts the length of the laser cavity 4 to maintain the laser output beam 6 in its most efficient single longitudinal mode. FIG. 14 is a flow chart that shows the methodology of this operation.

The methodology of the invention may be implemented with hardware alone, or a with a combination of hardware and data processing code if the SLM processor 20 provides for programmable data processing. In the preferred embodiment, the SLM processor includes a programmable data processor that accepts the signals from the pointing detector 18 and determines the output to the position transducer 22. Any one of a variety of data processing codes may be used to implement the methodology of the invention, as will be appreciated by those skilled in the art.

For example, the following code, written in Microsoft ® QuickBASIC ®, may be used to perform the methodology of the invention:

```
balance % = 0
sum# = 0!
rr% = Display CLockauto, 1, 1)        'display activity on screen
FOR l% = 1 TO 600
    rr% = LABPC (Cgetdta, kk%)         'get data
    sum# + kk%                         'add data to sum
```

```
                              -continued
Rand%  = (RND - .5) * 300              'make a random number
rr = Burleigh (Concstep, Cmode, SGN(Rand%), ABS(Rand%)
                                       'move Burleigh
NEXTI%
balance% = sum# / 600                  'Balance = ave. SPD
                                        signal
lockon% = 1                            'start locking
rr% = Display(Clockon, 1,1)            'display locking
rr% = Display(Cdecbal, balance%, 1)
rr% = Display(Cincbal, balance%, 1)
                                       'move display line up and
                                       'down to force display
```

RETURN

In this code, the variable balance $\% = (I_{right} - I_{left})/(I_{right} + I_{left})$, $I_{right}$ and $I_{left}$ being the same two signals from the bi-cell pointing detector 18 as described. A loop of 600 random changes in length of the laser cavity 4 is made, and the balance % variable is added to the sum# variable. After all 600 changes, the average balance $\% = \text{sum}\#/600$. The locking loop is then turned on and the feedback loop is initiated with balance %. The feedback loop then adjusts the length of the laser cavity 4.

The automated single mode locking technique according to the invention allows the laser cavity 4 to automatically change its length according to a frequency shift of the dispersive optics feedback that may result from retuning the operating frequency of the laser system 2 by shifting the frequency of the dispersive optics feedback. This technique allows the laser system 2 to be tuned over a wide range of frequencies by readjusting the dispersive optics feedback alone, since the length of the laser cavity 4 automatically locks onto the the most stable mode for any dispersive optics feedback setting.

Thus there has been described herein a method and apparatus to automatically adjust cavity length and sense the character of longitudinal modes in the laser output to maintain single longitudinal mode operation even during adjustments in the optically dispersive feedback elements of the laser that cause changes in wavelength. It will be understood that various changes in the details, materials, steps and arrangements of parts that have been described and illustrated above in order to explain the nature of the invention may be made by those of ordinary skill in the art within the principle and scope of the present invention as expressed in the appended claims.

What is claimed is:

1. A method for shifting a resonant cavity length of a laser cavity for a laser oscillator in response to a change in a pointing direction of a laser beam controlled by a dispersive optical feedback system in the laser oscillator, comprising the steps of:

changing said resonant cavity length to define a series of resonant cavity lengths;

detecting said laser beam pointing direction for each said resonant cavity length in said series of lengths to create a series of pointing direction samples that correspond to said series of resonant cavity lengths;

averaging said series of pointing direction samples to determine an average pointing direction for said laser beam; and locking said laser beam in a stable single longitudinal mode by controlling said laser beam pointing direction to remain in said average pointing direction.

2. The method set forth in claim 1, wherein said step of changing said resonant cavity length comprises random variation of said resonant cavity length.

3. The method set forth in claim 1, wherein said step of changing said resonant cavity length comprises systematic variation of said resonant cavity length.

4. The method set forth in claim 1, wherein said step of detecting comprises detecting an output beam of said laser oscillator.

5. The method set forth in claim 1, wherein said step of detecting comprises detecting a dispersion beam that is diffracted by dispersion optics of said laser oscillator.

6. Apparatus for shifting a resonant cavity length of a laser cavity for a laser oscillator in response to a change in a pointing direction of a laser beam controlled by a dispersive optical feedback system in the laser oscillator, comprising:

means for changing said resonant cavity length to define a series of resonant cavity lengths;

means for detecting said laser beam pointing direction for each said resonant cavity length in said series of lengths to create a series of pointing direction samples that correspond to said series of resonant cavity lengths;

means for averaging said series of pointing direction samples to determine an average pointing direction for said laser beam; and means for locking said laser beam in a stable single longitudinal mode by controlling said laser beam pointing direction to remain in said average pointing direction.

7. The apparatus set forth in claim 6, wherein said means for changing said resonant cavity length randomly varies said resonant cavity length.

8. The apparatus set forth in claim 6, wherein said means for changing said resonant cavity length systematically varies the length of said laser cavity.

9. The apparatus set forth in claim 6, wherein said means for detecting detects an output beam of said laser oscillator.

10. The apparatus set forth in claim 6, wherein said means for detecting detects a dispersion beam that is diffracted by dispersion optics of said laser oscillator.

* * * * *